United States Patent Office

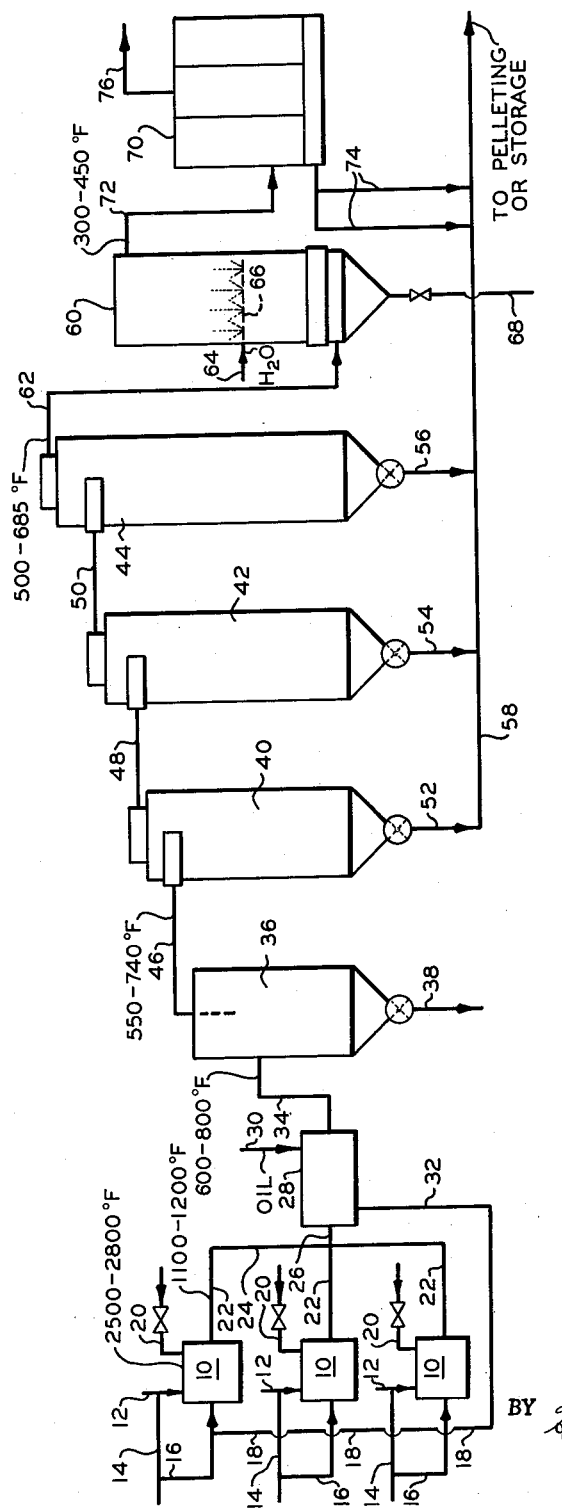

3,017,249
Patented Jan. 16, 1962

3,017,249
CARBON BLACK RECOVERY
Donald A. Marsh, Bartlesville, Okla., assignor to Phillips Petroleum Company, a corporation of Delaware
Filed Oct. 6, 1959, Ser. No. 844,654
5 Claims. (Cl. 23—209.4)

This invention relates to an apparatus and process for recovery of carbon black from the effluent smoke from carbon black reactors or furnaces.

In the production of carbon black by the pyrolytic cracking of a fluid hydrocarbon feed at temperatures in the range of about 2500 to 2800° F., the furnace effluent is quenched in the effluent end of the furnace by spraying water into the hot gases to knock the temperature down to about 1200° F. The quenched effluent is thereafter given a second water quenching in a secondary quench tower to further reduce the temperature of the smoke stream to about 400 to 500° F. before passing the quenched stream through carbon black recovery apparatus including cyclone separators, grit separators and Cottrell precipitators. In some plants, the effluent smoke from the secondary quench is passed through a Cottrell precipitator and then through primary and secondary cyclone separators, after which the effluent from the secondary cyclone is passed through a tertiary quench tower before passing the quenched stream to a bag filter unit. In other plants the effluent from the secondary quench is passed through a plurality of cyclone separators and then through a tertiary quench tower before being passed to a bag filter unit.

In the prior art processes, the secondary quench greatly increases the volume of the quenched effluent which must be passed through the cyclone separators and the Cottrell precipitator (in the event such is utilized) thereby requiring a great deal of capacity in the separators which adds to the cost of plant equipment and plant space. This invention is concerned with an arrangement of apparatus and a method of carbon black recovery which simplifies the plant equipment and reduces these costs.

Accordingly it is an object of the invention to provide a process and apparatus for carbon black recovery from the effluent of carbon black furnaces. Another object is to provide an improved process and arrangement of apparatus for carbon black recovery which reduces the capacity requirements of the recovery apparatus elements. A further object is to provide a process and apparatus for carbon black recovery which reduces the amount of insulation required on the recovery equipment. Other objects of the invention may become apparent upon consideration of the accompanying disclosure.

In accordance with the invention, the hot smoke from one or more carbon black furnaces, quenched to a temperature in the range of 600 to 800° F., is passed through a plurality of cyclone separators to recover entrained black therefrom and is then given a second water quench to reduce the temperature to the range of 300 to 450° F. before passing the quenched effluent to the bag filter unit to recover the residual carbon black therein. By maintaining the temperature of the smoke stream entering the cyclone separators in the range of about 600 to 800° F., it is unnecessary to insulate the main body of the cyclone separators and the intervening lines, as well as the line leading to the secondary quench tower. In this way, a substantial cooling of the smoke stream is effected by loss of heat through the equipment to the atmosphere, thereby materially reducing the amount of water required in the secondary quench tower with resultant decrease in volume of the quenched effluent. This reduction in the volume of effluent stream from the secondary quench tower has the effect of reducing the filtering surface requirements in the bag filter, thereby reducing the size of this unit and materially decreasing equipment costs. Also, by maintaining the temperature of the smoke stream passing through the cyclone separators at this higher level, insulation of the separators can be omitted without danger of condensation of moisture within the separators which must be avoided in order to prevent mud formation. Moreover, the volume of the smoke stream passing through the cyclone separators is much less when applying the secondary quench downstream thereof than it is when the secondary quench is applied upstream of these separators.

A more complete understanding of the invention may be had by reference to the accompanying schematic drawing which shows an arrangement of apparatus for carbon black recovery downstream of a series of carbon black furnaces in accordance with the invention.

Referring to the drawing a series of carbon black furnaces or reactors 10 is shown, each of which is provided with a fuel gas feed line 12, a tangential air line 14, an axial air line 16, and an axial hydrocarbon oil line 18. Each of the furnaces is also provided with a water quench line 20 leading into the effluent end of the furnace. Effluent smoke lines 22 connect with smoke header 24 which feeds the smoke through conduit 26 into indirect heating exchanger 28. Oil is passed from line 30 in indirect heat exchange in exchanger 28 with the effluent smoke and then to line 32 which supplies oil to axial feed lines 18. The effluent smoke from heat exchanger 28 is passed through line 34 to grit separator 36 for removal of grit from the smoke, the grit falling to the bottom of the separator and being removed through line 38. The grit-free smoke is passed through a series of 3 cyclone separators 40, 42, and 44 connected in series with the grit separator by lines 46, 48, and 50. Carbon black dropped out of the smoke in the separators is recovered through lines 52, 54, and 56 which lead into conveyor line 58.

A secondary quench tower 60 is positioned downstream of cyclone 44 and is connected therewith by means of conduit 62. A water line 64 supplies sprays 66 in the quench tower. Line 68 is provided for withdrawal of water and solids knocked down in quench tower 60. A bag filter unit 70 is positioned downstream of quench tower 60 and connected therewith by means of line 72. Carbon black recovered by the bag filter unit is transferred to pick-up conveyor line 58 through conveyor lines 74. Clean-off gas from unit 70 is vented through stack 76. In some applications, off gas from stack 76 is passed to wet pellet driers (not shown), utilized in the pelleting process downstream of the apparatus shown. Pick-up conveyor line 58 leads to collecting and pelleting apparatus not shown.

Bag filter unit 70 is preferably designed and constructed in accordance with the unit disclosed and claimed in U.S. Patent No. 2,805,732 of J. S. Martinez and as modified by the invention of copending U.S. application, Serial Number 840,878, filed September 18, 1959, wherein the recovered carbon black is transferred to the front end of the filter unit into which the feed gas is passed.

While three cyclone separators arranged in series are shown in the drawing, it is feasible to omit the third cyclone in the series (cyclone 44) in some applications by properly designing separators 40 and 42. It is also feasible to omit grit separator 36 and place a grit deflector in the secondary quench tower 60. On the other hand it may be advantageous with some feed stocks to utilize the grit separator 36 and also place a grit reflector in quench tower 60.

In operation an oil feed of a suitable BMCI (Bureau of Mines Carbon Index) value is fed axially into reactors 10 after being preheated in heat exchanger 28 to about 500° to 600° F. and is pyrolytically cracked in furnaces 10 within a spiralling jacket of hot combustion gas formed by burning a mixture of air and fuel gas injected tangentially into the furnace from lines 12 and 14. The hot gases formed in the furnace are quenched from a temperature in the range of 2500 to 2800° F. to a temperature in the range of 800 to 1000° F. by injecting water through lines 20 as a primary quench. The furnace effluent is passed through atmospheric cooling pipes 22 to header 24 which feeds the smoke to heat exchanger 28 via line 26. The effluent from heat exchanger 28 at a temperature in the range of 600 to 800° F. is passed through grit separator 36 which knocks grit from the smoke before passing the same through conduit 46 to primary cyclone 40. In passing through grit separator 36 the smoke is cooled to a temperature in the range of about 550 to 740° F. In passing through cyclones 40, 42, and 44, most of the carbon black is removed from the smoke and the temperature of the effluent gas containing residual carbon is reduced to the range of about 500 to 685° F. Only the bottom conical sections of grit separator 36 and cyclones 40, 42, and 44 need be insulated, the upper cylindrical sections being uninsulated metal which rapidly dispenses heat to the atmosphere. It is essential to insulate the conical sections of these vessels because of the static condition of the solids and gas therein and the tendency to condense moisture under such conditions, without insulation.

The gaseous effluent in line 62 is passed through quench tower 60 to knock the temperature down to not more than 500° F. and, preferably, to the range of 300 to 450° F. before passing the gas into bag filter unit 70. The bag filters, when woven of glass, withstand temperatures up to about 500° F. When woven of synthetic fibers, such as "Orlon," temperatures must be maintained below about 400° F., thereby requiring reduction in temperature of the inlet gas to this level or lower. Recovered carbon black from the two rows of filtering compartments in unit 70 is passed by separate screw conveyors into lines 74 from which it is passed into pick-up conveyor line 58 for passage to pelleting or to suitable receiving means.

Arrangement of the plant equipment as shown in the drawing and in actual plant construction, effects the several advantages discussed heretofore and now summarized below. The higher temperatures maintained in the grit separator and cyclones obviate the necessity of insulation on the cylindrical body sections of these vessels. Also, the substantial cooling and reduction in temperature in the gas stream as it passes thru these vessels and connecting lines greatly reduces the quench water volume introduced in the secondary quench, thereby reducing the bag filter capacity to about half the size required for a similar stream quench by water in a secondary quench upstream of the cyclones and grit separator. Further, the volume capacity requirements of the cyclones is also reduced to about 60 percent of that required when the secondary quench is placed upstream of the grit separator. These advantages are significant since they result in substantial savings in plant costs and lower the cost of carbon black production.

Certain modifications of the invetnion will become apparent to those skilled in the art and the illustrative details disclosed are not to be construed as imposing unnecessary limitations on the invention.

I claim:

1. A process for recovering carbon black from the smoke from a carbon black furnace comprising quenching the furnace smoke containing carbon black to a temperature in the range of 600–800° F., passing the quenched gaseous stream without further quenching, other than heat loss to the atmosphere, thru a plurality of cyclone separators in indirect heat exchange with the atmosphere thru the uninsulated walls thereof to further reduce the temperature of said stream to the range of about 500 to 685° F. and to recover entrained black; water quenching the gaseous effluent from the downstream cyclone to a temperature in the range of 300 to 450° F.; and passing the quenched gaseous stream thru a bag filter unit to recover substantially all of the remaining carbon black therein.

2. The process of claim 1 wherein the gaseous stream is passed thru a grit separator prior to passage thru said cyclone separators.

3. The process of claim 1 wherein said gaseous stream is cooled by heat loss to atmosphere in the cyclones and connecting conduits about 75 to 100° F. before passage to the downstream quench step so as to reduce the volume of $H_2O$ in the quenched stream, thereby reducing the bag filter capacity requirements.

4. The process of claim 2 wherein the temperature of the gaseous stream entering said grid separator is maintained in the range of 600 to 800° F., the grit separator gaseous effluent is maintained within the range of 550 to 740° F. and is passed successively thru three cyclones, and the gaseous effluent from the downstream cyclone passing to the quench step is maintained in the range of 500 to 685° F.

5. A process for producing carbon black comprising pyrolytically cracking a fluid hydrocarbon feed at a temperature in the range of 2500 to 2800° F.; quenching the resulting stream to a temperature in the range of 600 to 800° F.; passing said stream thru a series of uninsulated metal cyclone separators without further quenching, other than heat loss to the atmosphere, so as to effect indirect heat exchange of said stream with the atmosphere thru the metal separators and recover black from said stream; water quenching the gaseous effluent from the downstream separator to a temperature in the range of 300 to 450° F.; passing the quenched gaseous stream thru a bag filter unit to recover residual carbon black, the removal of heat in said separators reducing the amount of water required to reduce the temperature of the stream entering said bag filter unit and the volume of said stream so as to reduce the required capacity of said unit; and collecting the carbon black recovered in said separators and said filter unit.

References Cited in the file of this patent

UNITED STATES PATENTS

| | | |
|---|---|---|
| 2,717,658 | Bethea et al. | Sept. 13, 1955 |
| 2,746,564 | Williams | May 22, 1956 |
| 2,835,562 | Boyer et al. | May 20, 1958 |